United States Patent
Rayfield

(10) Patent No.: US 9,474,261 B1
(45) Date of Patent: Oct. 25, 2016

(54) REMOTELY CONTROLLED TIP UP ASSEMBLY

(71) Applicant: Theodore A. Rayfield, Hayward, WI (US)

(72) Inventor: Theodore A. Rayfield, Hayward, WI (US)

( * ) Notice: Subject to any disclaimer, the term of this patent is extended or adjusted under 35 U.S.C. 154(b) by 0 days.

(21) Appl. No.: 14/987,855

(22) Filed: Jan. 5, 2016

Related U.S. Application Data

(60) Provisional application No. 62/100,112, filed on Jan. 6, 2015.

(51) Int. Cl.
*A01K 97/12* (2006.01)
*A01K 97/01* (2006.01)
*A01K 97/11* (2006.01)

(52) U.S. Cl.
CPC ............... *A01K 97/01* (2013.01); *A01K 97/11* (2013.01); *A01K 97/12* (2013.01); *A01K 97/125* (2013.01)

(58) Field of Classification Search
CPC ..... A01K 97/125; A01K 97/12; A01K 97/01
USPC ...................................... 43/17, 17.5
See application file for complete search history.

(56) References Cited

U.S. PATENT DOCUMENTS

| | | | | |
|---|---|---|---|---|
| 1,737,921 A * | 12/1929 | Derr | ..................... | A01K 97/125 43/17 |
| 2,089,097 A * | 8/1937 | Millett | .................... | A01K 97/01 43/16 |
| 2,122,841 A * | 7/1938 | Laurila | .................. | A01K 97/01 43/17 |
| 2,170,000 A * | 8/1939 | Eggleston | ............... | A01K 97/01 43/17 |
| 2,506,092 A * | 5/1950 | Lyons | ..................... | A01K 97/01 43/17 |
| 2,654,176 A * | 10/1953 | Kachelski | ............... | A01K 97/01 43/17 |
| 2,720,719 A * | 10/1955 | Stancheck | .............. | A01K 97/01 43/17 |
| 2,741,054 A * | 4/1956 | Brundage | ............... | A01K 97/01 43/17 |
| 2,837,857 A * | 6/1958 | Albert | .................... | A01K 97/01 43/17 |
| 2,863,251 A * | 12/1958 | Ackerman | ........... | A01K 97/125 43/17 |
| 2,973,599 A * | 3/1961 | Olson | .................... | A01K 97/01 43/17 |
| 3,134,187 A * | 5/1964 | Blakely | ................ | A01K 97/125 43/17 |

(Continued)

FOREIGN PATENT DOCUMENTS

| CA | 2340360 A1 * | 12/2000 | ............. A01K 97/01 |
|---|---|---|---|
| GB | 2240019 A * | 7/1991 | ........... A01K 97/125 |

(Continued)

*Primary Examiner* — Darren W Ark
(74) *Attorney, Agent, or Firm* — Tipton L. Randall

(57) ABSTRACT

A remotely controlled tip up assembly for ice fishing includes a platform with a linear slot and a spindle and spool assembly on a rotatable mounting block secured therein with a trigger opposite the spool. A spring-biased signal pole on the platform reversibly engages the trigger member. A signal system actuated upon movement of the signal pole includes a flag, a light and an audible signal. A communications component on the platform includes a power source connected to the light, audible signal, a second light illuminating the trigger on the shaft and spindle assembly, a radio signal source, and an ON/OFF switch. A separate remote control device for radio communication with the electronics component includes a second signaling means to notify the fisherman of actuation of the signal system.

19 Claims, 14 Drawing Sheets

(56) References Cited

U.S. PATENT DOCUMENTS

| | | | | |
|---|---|---|---|---|
| 3,352,048 A * | 11/1967 | Fleming | A01K 97/01 | 43/17 |
| 3,359,673 A * | 12/1967 | Roemer | A01K 97/01 | 43/17 |
| 3,378,945 A * | 4/1968 | Johnson | A01K 97/01 | 43/17 |
| 3,470,647 A * | 10/1969 | Horner | A01K 97/01 | 43/17 |
| 3,545,118 A * | 12/1970 | Stelmach | A01K 97/01 | 43/17 |
| 3,546,805 A * | 12/1970 | Schaefer | A01K 97/10 | 43/17 |
| 3,641,693 A * | 2/1972 | Pinnow | A01K 97/01 | 43/17 |
| 3,879,880 A * | 4/1975 | Bailey | A01K 97/125 | 43/17 |
| 4,021,958 A * | 5/1977 | Snodie | A01K 97/12 | 43/17 |
| 4,270,297 A * | 6/1981 | Yates | A01K 97/01 | 43/17 |
| 4,285,154 A * | 8/1981 | Grahl | A01K 97/01 | 43/17 |
| 4,566,216 A * | 1/1986 | Randall | A01K 97/01 | 43/17 |
| 4,616,437 A * | 10/1986 | Harvey | A01K 97/125 | 43/17 |
| 4,633,608 A * | 1/1987 | Savarino | A01K 97/125 | 43/17 |
| 4,727,673 A * | 3/1988 | Dumar | A01K 97/01 | 43/17 |
| 4,887,777 A * | 12/1989 | Rasmussen | A01K 97/01 | 43/17 |
| 4,928,419 A * | 5/1990 | Forrestal | A01K 97/125 | 43/17 |
| 4,934,090 A * | 6/1990 | Storey | A01K 97/125 | 43/17 |
| 4,996,788 A * | 3/1991 | Wieting | A01K 97/01 | 43/17 |
| 5,067,269 A * | 11/1991 | Eppley | A01K 97/01 | 43/17 |
| 5,097,618 A * | 3/1992 | Stoffel | A01K 97/125 | 43/17 |
| 5,157,855 A * | 10/1992 | Schmidt | A01K 97/01 | 43/17 |
| 5,235,773 A * | 8/1993 | Rinehart | A01K 97/01 | 43/17 |
| 5,339,558 A * | 8/1994 | Monsen | A01K 97/01 | 43/17 |
| 5,448,850 A * | 9/1995 | Gonnello | A01K 97/01 | 43/17 |
| 5,564,213 A * | 10/1996 | Rinehart | A01K 97/01 | 43/17 |
| 5,896,694 A * | 4/1999 | Midha | A01K 97/01 | 43/17 |
| 6,170,189 B1 * | 1/2001 | Klein | A01K 97/10 | 43/17 |
| 6,374,532 B1 * | 4/2002 | Klein | A01K 97/01 | 43/17 |
| 6,408,561 B1 * | 6/2002 | Winter | A01K 97/125 | 43/17 |
| 6,487,812 B2 * | 12/2002 | Johnson | A01K 97/125 | 43/17 |
| 6,564,496 B2 * | 5/2003 | Scherg | A01K 97/01 | 43/17 |
| 6,671,994 B1 * | 1/2004 | Klein | A01K 93/02 | 43/17 |
| 6,857,218 B1 * | 2/2005 | Grahl | A01K 97/01 | 43/17 |
| 7,008,086 B1 * | 3/2006 | Kell | A01K 97/125 | 43/17.5 |
| 7,207,133 B2 * | 4/2007 | Schiemann | A01K 97/01 | 43/17 |
| 7,395,628 B2 * | 7/2008 | Rayfield | A01K 97/125 | 43/17 |
| 7,624,531 B2 * | 12/2009 | Kirby | A01K 97/125 | 43/17 |
| 7,992,341 B1 * | 8/2011 | Renstrom | A01K 97/01 | 43/17 |
| 8,756,854 B1 * | 6/2014 | Michaels | A01K 97/01 | 43/17 |
| 8,896,450 B1 * | 11/2014 | Overbye | A01K 97/125 | 43/17 |
| 9,398,764 B2 * | 7/2016 | Trout | A01K 97/125 | |
| 2006/0130387 A1 * | 6/2006 | Shumansky | A01K 97/01 | 43/17 |
| 2007/0169395 A1 * | 7/2007 | Rayfield | A01K 97/125 | 43/17 |
| 2007/0227057 A1 * | 10/2007 | Holmberg | A01K 97/01 | 43/17 |
| 2009/0139130 A1 * | 6/2009 | Nozzarella | A01K 97/01 | 43/17 |
| 2014/0367506 A1 * | 12/2014 | Hancock | A01K 97/01 | 242/283 |
| 2015/0113853 A1 * | 4/2015 | McKeough | A01K 97/125 | 43/17 |
| 2016/0106086 A1 * | 4/2016 | Braaten | A01K 97/125 | 43/17 |

FOREIGN PATENT DOCUMENTS

| | | | | |
|---|---|---|---|---|
| GB | 2300097 A * | 10/1996 | | A01K 97/125 |
| GB | 2335338 A * | 9/1999 | | A01K 97/125 |
| GB | 2410165 A * | 7/2005 | | A01K 97/125 |
| JP | 10150898 A * | 6/1998 | | |
| JP | 2002233284 A * | 8/2002 | | |
| JP | 2003250413 A * | 9/2003 | | |
| JP | 2004201559 A * | 7/2004 | | |
| WO | WO 0074480 A2 * | 12/2000 | | A01K 97/01 |
| WO | WO 0074480 A3 * | 8/2001 | | A01K 97/01 |

* cited by examiner

REMOTELY CONTROLLED TIP UP ASSEMBLY

CROSS-REFERENCE TO RELATED APPLICATIONS, IF ANY

This application claims the benefit under 35 U.S.C. §119 (e) of provisional application Ser. No. 62/100,112, filed 6 Jan. 2015. Application Ser. No. 62/100,112 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a fishing device and, more particularly, to an ice fishing device having a signaling device plus a communications module and, most particularly, to an ice fishing device having a signaling device, a communications module and a remote control device for both sending instructions to and receiving information from the communications module.

2. Background Information

Ice fishing is a popular sport in many northern states where the weather is sufficiently cold to freeze water to a sufficient thickness that it will support an individual. Many ice fishing devices are currently available, which allow an individual to cut a hole in the ice and place a hook and line down the hole in hopes of enticing a fish to bite the bait and become hooked. Most states allow the use of two or three fishing lines for use by a single individual. It is difficult for a single individual to handle separate fishing lines at the same time. To overcome this difficulty, a variety of devices have been made that allows one individual to fish with several fishing lines at the same time.

One popular device is termed a "tip up" device, which allows fishing using several fishing lines with minimal attention by one individual. The tip up device generally includes a spool of line on a first linear support and a second support positioned perpendicular to the first support. The first support with the spool of line is inserted into the water through a hole cut in the ice. The perpendicular support is sufficiently sized to keep the whole device from sinking though the hole in the ice.

When a fish takes the bait and swims away from the hole and the device suspended there below, the spool turns as the line unwinds. Because the spool is below the ice, the fisherman must somehow determine that the spool is turning. The fishing device has some type of mechanical linkage between the spool and a signaling device to notify the fisherman of the fish pulling out line from the spool.

A wide variety of such linkages between the spool and the signaling device are currently in use, as well as a variety of signaling devices. The most common signaling device is a flag on a spring that is held down with the spool at rest and raised into the air with the spool moving. Thus, the name "tip up" for the fishing device. Other signaling devices include a light that is turned on only when a fish bites. This signaling device is often used for fishing under dark conditions.

Applicant has invented a tip up fishing assembly that provides several signal methods as well as being remotely controlled for ease of use. The instant invention provides a unique and novel improvement over the existing technology.

SUMMARY OF THE INVENTION

The invention is a remotely controlled tip up assembly for catching fish through a hole through the ice. The tip up assembly comprises a planar platform member having a long axis and a short axis and the platform member spans the hole in the surface of ice. The planar platform member has a first surface positionable opposite the surface of ice and a second surface positionable adjacent the surface of ice. The planar platform member has a linear slot there through extending along the long axis thereof. A spindle and spool assembly includes a rotatable shaft assembly having a first end and a second end, the rotatable shaft assembly including a stationary outer tube and a rotatable inner shaft with a mounting block member secured to the outer tube a selected distance from the first end of the rotatable shaft assembly. The rotatable shaft assembly and mounting block member are sized to fit within the linear slot of the planar platform member. The rotatable inner shaft has a trigger member attached at a first end and a spool member and a line guide member attached at a second end. The rotatable shaft assembly, trigger member, spool member and line guide member are also sized to pass through the linear slot of the planar platform member. The mounting block member is rotatably secured within the linear slot of the planar platform member and is selectively rotatable and lockable to maintain the rotatable shaft assembly parallel with said planar platform member or perpendicular to said planar platform member, thereby adapting the second end of the shaft assembly to extended into the hole in the ice.

A signal pole member mounted on the first side of the planar platform member adjacent one end thereof. The signal pole member is spring-biased to an upright position and manually positionable to a bent-over position. The signal pole member has a trigger release member reversibly engaging the trigger member of the rotatable shaft assembly and operative to hold the signal pole member in the bent-over position until such time as said spool member rotates, thereby rotating the inner shaft and attached trigger member to release the trigger release member and attached signal pole member, thereby enabling the signal pole member to spring to an upright position.

A signal system is actuated upon movement of the signal pole member from parallel with the planar platform member to perpendicular there to. The signal system including a visual signal of a signal flag, at least one light source, an audible signal source and a radio signal source. An electronics communications module is secured to the first side of the planar platform member adjacent to the signal pole member and includes a power source connected to and selectively powering the light signal, the audible signal source, a second light source illuminating the trigger member on the shaft and spindle assembly, the radio signal source, and includes an ON/OFF switch controlling the power source. A remote control device for radio communication with the electronics component includes a second signaling means to notify the fisherman of the actuation of the signal system.

DESCRIPTION OF THE EMBODIMENTS

Figure 1:
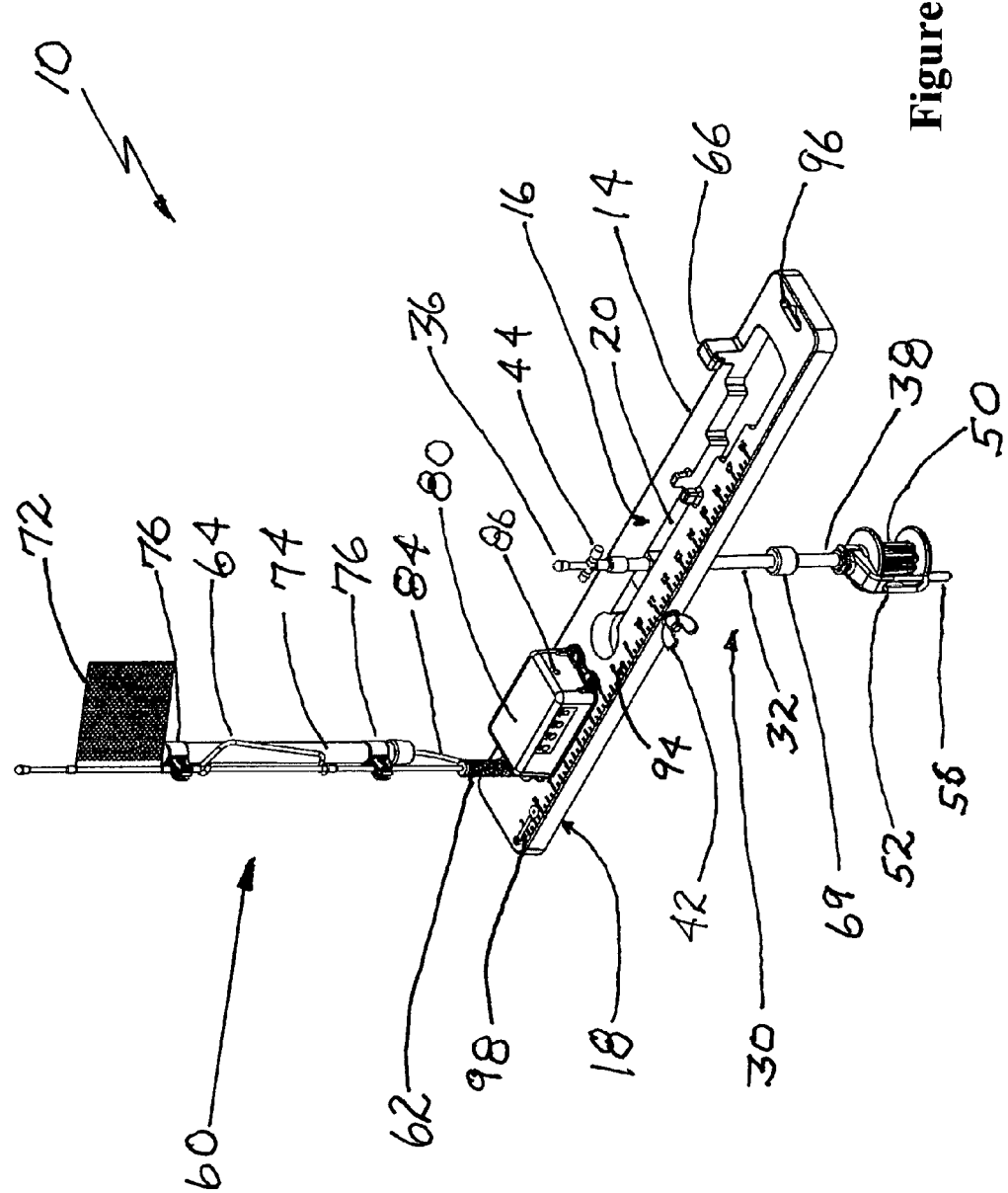
FIG. 1 is a perspective view of the remotely controlled tip up assembly of the present invention in a deployed configuration.
Figure 2:
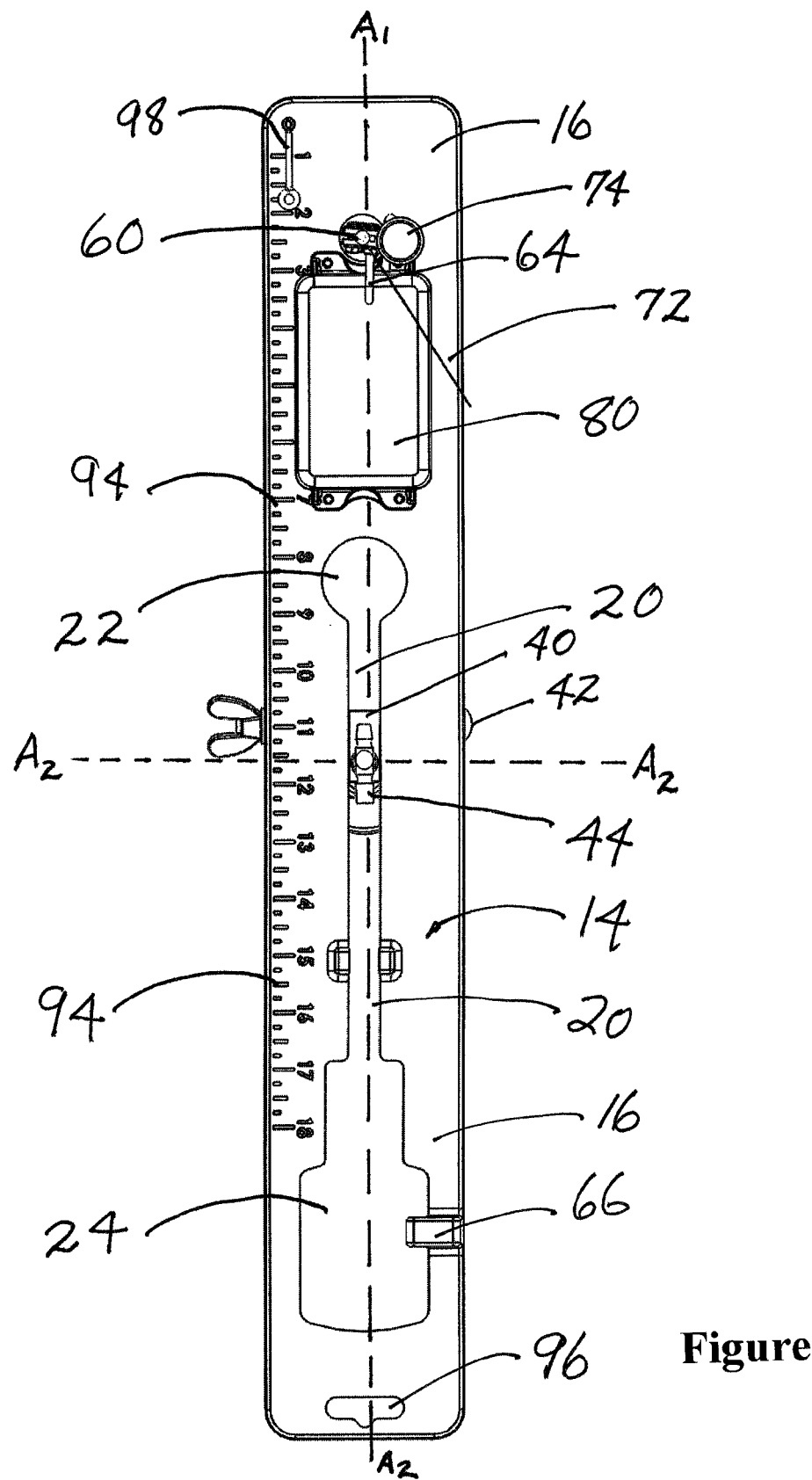
FIG. 2 is a top view of the remotely controlled tip up assembly of FIG. 1 of the present invention.
Figure 3:
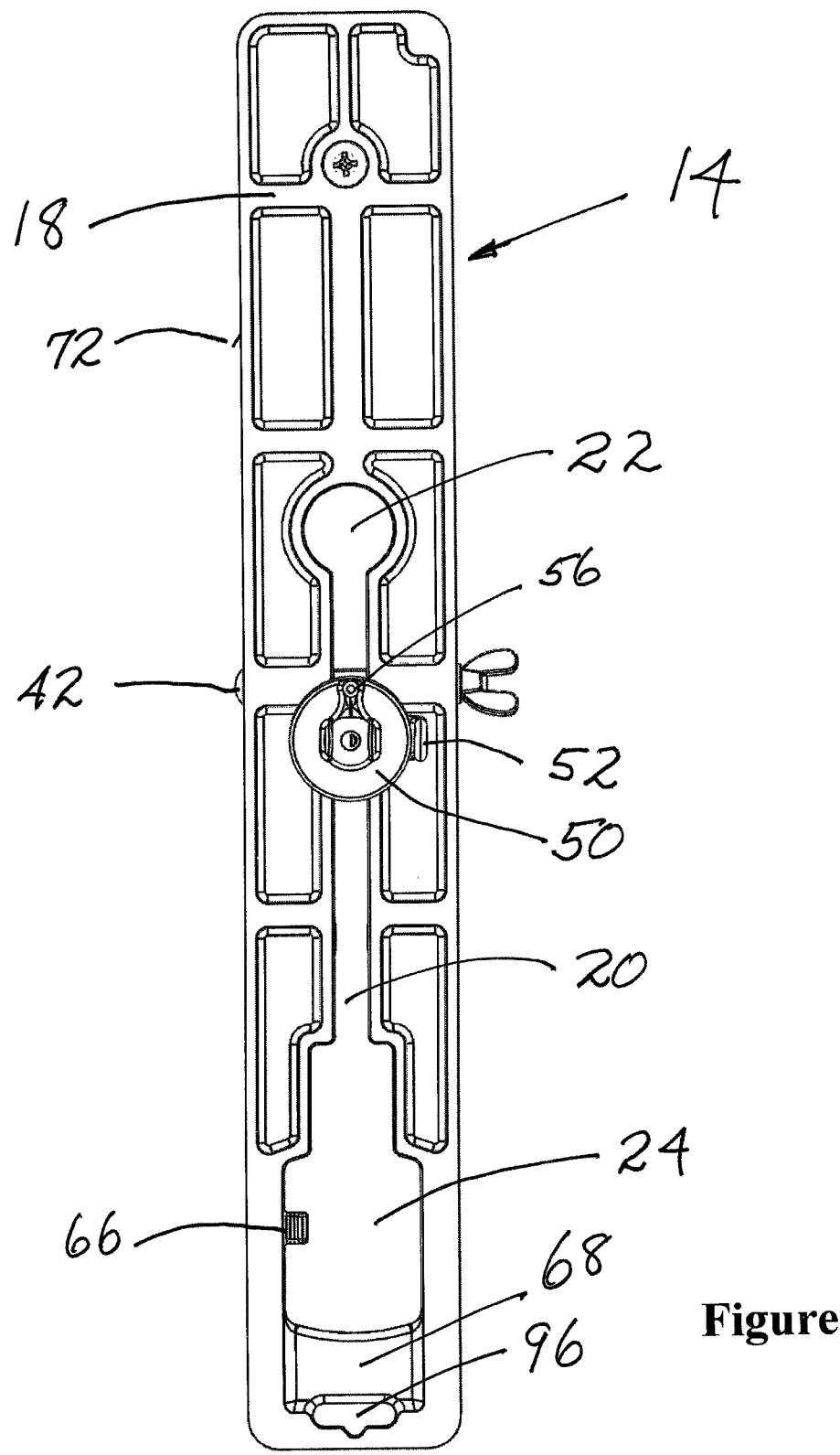
FIG. 3 is a bottom view of the remotely controlled tip up assembly of FIG. 1 of the present invention.
Figure 4:
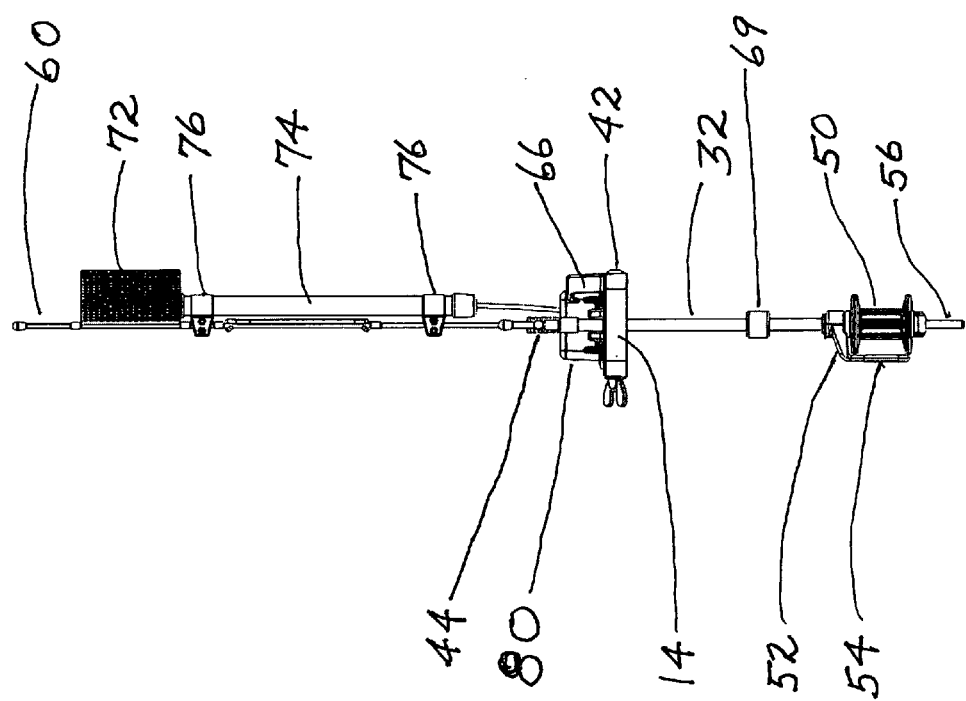
FIG. 4 is a right end view of the remotely controlled tip up assembly of FIG. 1 of the present invention.
Figure 5:
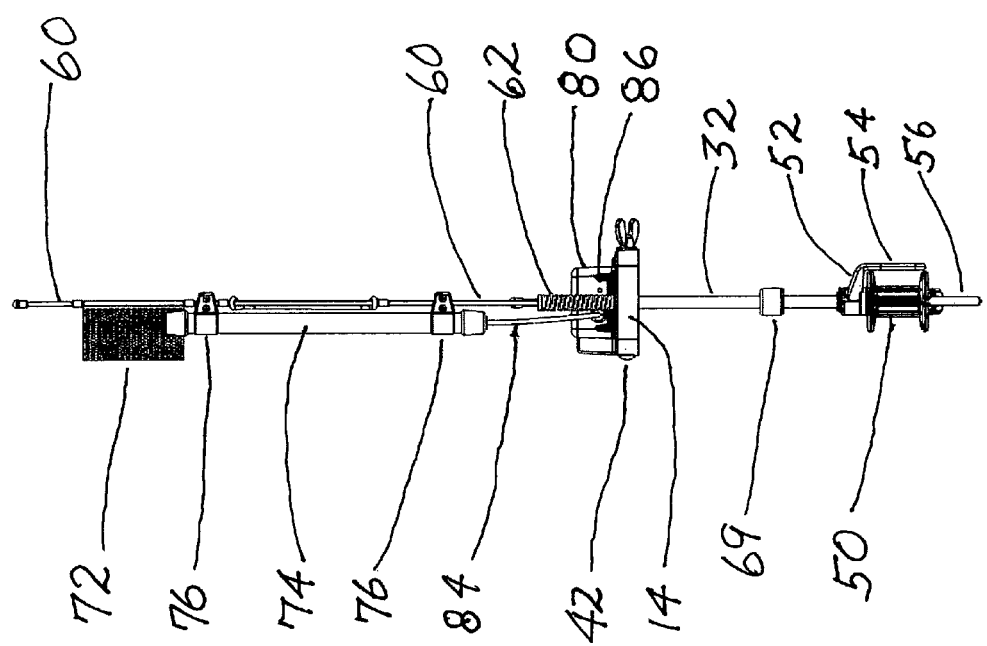
FIG. 5 is a left end view of the remotely controlled tip up assembly of FIG. 1 of the present invention.

Nomenclature
10 Tip Up Assembly
14 Planar Platform Member
16 First Surface of Planar Platform Member
18 Second Surface of Planar Platform Member
20 Linear Slot of Planar Platform Member
22 Enlarged Slot Section for Spool Member
24 Enlarged Slot Section for Trigger Member
30 Spindle and Spool Assembly
30 Rotatable Shaft assembly
32 Stationary Outer Tube
33 Rotatable Inner Shaft
34 Sealed Bearing
36 First End of Rotatable Inner Shaft
38 Second End of Rotatable Inner Shaft
39 Flat Area of Rotatable Inner Shaft
40 Mounting Block Member
41 Aperture of Mounting Block Member
42 Nut and Bolt Assembly
44 Trigger Member
48 End Cap of Line Guide
50 Spool Member
52 Line Guide Member for Spool Member
54 Aperture of Line Guide Member
56 Handle of Spool Member
57 Threaded Aperture of Spool Member
58 Set Screw of Spool Member
59 E-Clip Member
60 Signal Pole Member
62 Spring Member of Signal Pole Member
64 Trigger Release Member
66 Signal Pole Retainer
68 Spool Handle Storage Pocket
69 Barrel Lock Member
70 Signal System of Tip Up Assembly
72 Flag Member
74 Signal Light Member
76 Attachment Clips for Signal Light Member
78 Magnet Member of Signal System
79 Magnetic Switch of Signal System
80 Electronics Communication Module
82 Control Switch of Module
84 Power Cord to Signal Light Member
85 Light Indicator
86 Trigger Lighting Member
87 Low Battery Indicator
88 Internal Radio Signal Generator Source
89 Audio Signal Source
90 Remote Control Device
91 Antenna of Remote Control Device
92 Signaling Means of Remote Control Device
94 Linear Measure on Platform Member
96 Hanging Storage Aperture
98 Elastic Anchor for Hook/Leader Storage
99 Internal Power Source
$A_1$ Long Axis of Platform Member
$A_2$ Short Axis of Platform Member
Construction The invention is a remotely controlled tip up assembly for catching fish through a hole through the ice. The tip up assembly comprises a planar platform member having a long axis and a short axis and the platform member spans the hole in the surface of ice. The planar platform member has a first surface positionable opposite the surface of ice and a second surface positionable adjacent the surface of ice. The planar platform member has a linear slot there through extending along the long axis thereof. A spindle and spool assembly includes a rotatable shaft assembly having a first end and a second end, the rotatable shaft assembly including a stationary outer tube and a rotatable inner shaft with a mounting block member secured to the outer tube a selected distance from the first end of the rotatable shaft assembly. The rotatable shaft assembly and mounting block member are sized to fit within the linear slot of the planar platform member. The rotatable inner shaft has a trigger member attached at a first end and a spool member and a line guide member attached at a second end. The rotatable shaft assembly, trigger member, spool member and line guide member are also sized to pass through the linear slot of the planar platform member. The mounting block member is rotatably secured within the linear slot of the planar platform member and is selectively rotatable and lockable to maintain the rotatable shaft assembly parallel with said planar platform member or perpendicular to said planar platform member, thereby adapting the second end of the shaft assembly to extended into the hole in the ice.

A signal pole member mounted on the first side of the planar platform member adjacent one end thereof. The signal pole member is spring-biased to an upright position and manually positionable to a bent-over position. The signal pole member has a trigger release member reversibly engaging the trigger member of the rotatable shaft assembly and operative to hold the signal pole member in the bent-over position until such time as said spool member rotates, thereby rotating the inner shaft and attached trigger member to release the trigger release member and attached signal pole member, thereby enabling the signal pole member to spring to an upright position.

A signal system is actuated upon movement of the signal pole member from parallel with the planar platform member to perpendicular there to. The signal system including a visual signal of a signal flag, at least one light source, an audible signal source and a radio signal source. An electronics communications module is secured to the first side of the planar platform member adjacent to the signal pole member and includes a power source connected to and selectively powering the light signal, the audible signal source, a second light source illuminating the trigger member on the shaft and spindle assembly, the radio signal source, and includes an ON/OFF switch controlling the power source. A remote control device for radio communication with the electronics component includes a second signaling means to notify the fisherman of the actuation of the signal system.

Referring now to the various drawings, FIGS. 1-5 show a perspective view, a top view, a bottom view, and end views of the remotely controlled tip up assembly 10 in the deployed condition. In particular, the tip up assembly 10 includes a planar platform member 14 having a long axis $A_1$ and a short axis $A_2$, said platform member 14 adapted to span the hole in the surface of ice. The planar platform member 14 has a first surface 16 positionable opposite the surface of ice and a second surface 18 positionable adjacent the surface of ice. The planar platform member 14 contains a linear slot 20 there through, with the linear slot 20 extending along the long axis $A_1$ thereof. The linear slot 20 includes enlarged sections 22, 24 that function as described below.

A spindle and spool assembly 30 includes a rotatable shaft assembly 32 comprising a stationary outer tube 33 and a rotatable inner shaft 34. The inner shaft 34 has a first end 36 and a second end 38, the rotatable shaft assembly 30 including a mounting block member 40 secured to the stationary outer tube 33 a selected distance from said first end 36 thereof. The rotatable shaft assembly 32 and attached mounting block member 40 are sized to fit within and pass through the linear slot 20 of the planar platform member 14. The rotatable inner shaft 34 has a trigger member 44 attached at a first end 36 thereof and a spool member 50 and a line guide member 52 attached at a second end 38 thereof. The rotatable shaft assembly 32, trigger member 44, spool member 50 and line guide member 52 are sized to pass through the linear slot 20 of the planar platform member 14, with the trigger member 44, spool member 50 and line guide member 52 passing through the enlarged sections 22, 24 of the linear slot 20.

The rotatable mounting block member 40 is secured within the linear slot 20 of the planar platform member 14, with the rotatable mounting block member 40 selectively rotatable and lockable to maintain the rotatable shaft assembly 32 parallel with the planar platform member 14 or perpendicular to the planar platform member 14, thereby positioning the second end 38 of the rotatable shaft member 38 and attached spool member 50 and a line guide member 52 to extend down into the hole in the ice. A nut and bolt assembly 42 secures the mounting block member 40 within the linear slot 20 of the platform member 14 and provides locking and unlocking thereof. The planar platform member 14 is sufficiently supple that tightening the nut and bolt assembly 42 fixes the orientation of the spindle and spool assembly 30 relative to the platform member 14. Preferably, the planar platform member 14 is fabricated from a polymeric resin material.

Figure 6:
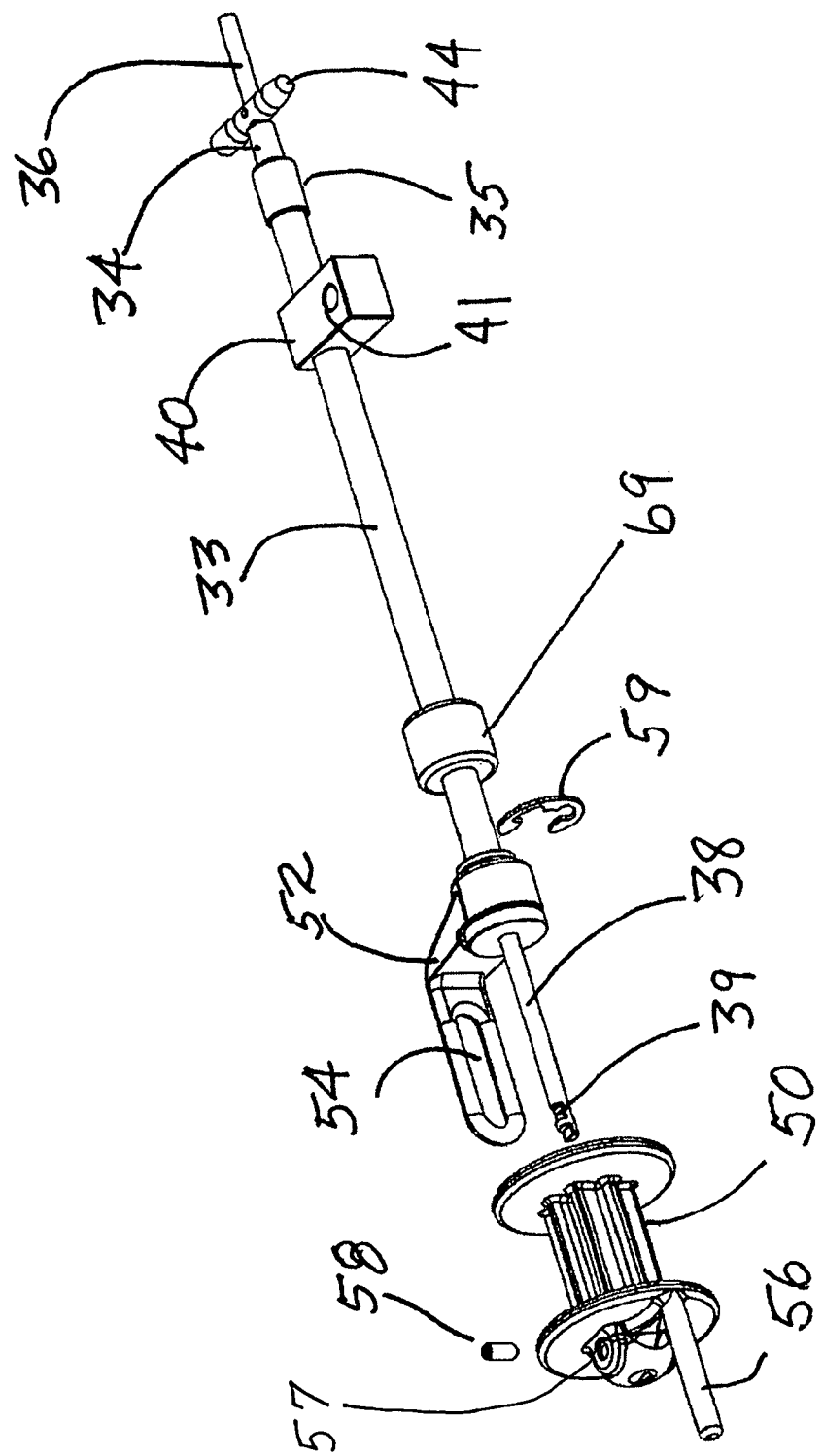
FIG. 6 is an exploded view of the spindle and spool assembly of the remotely controlled tip up assembly of the present invention.
Figure 7:
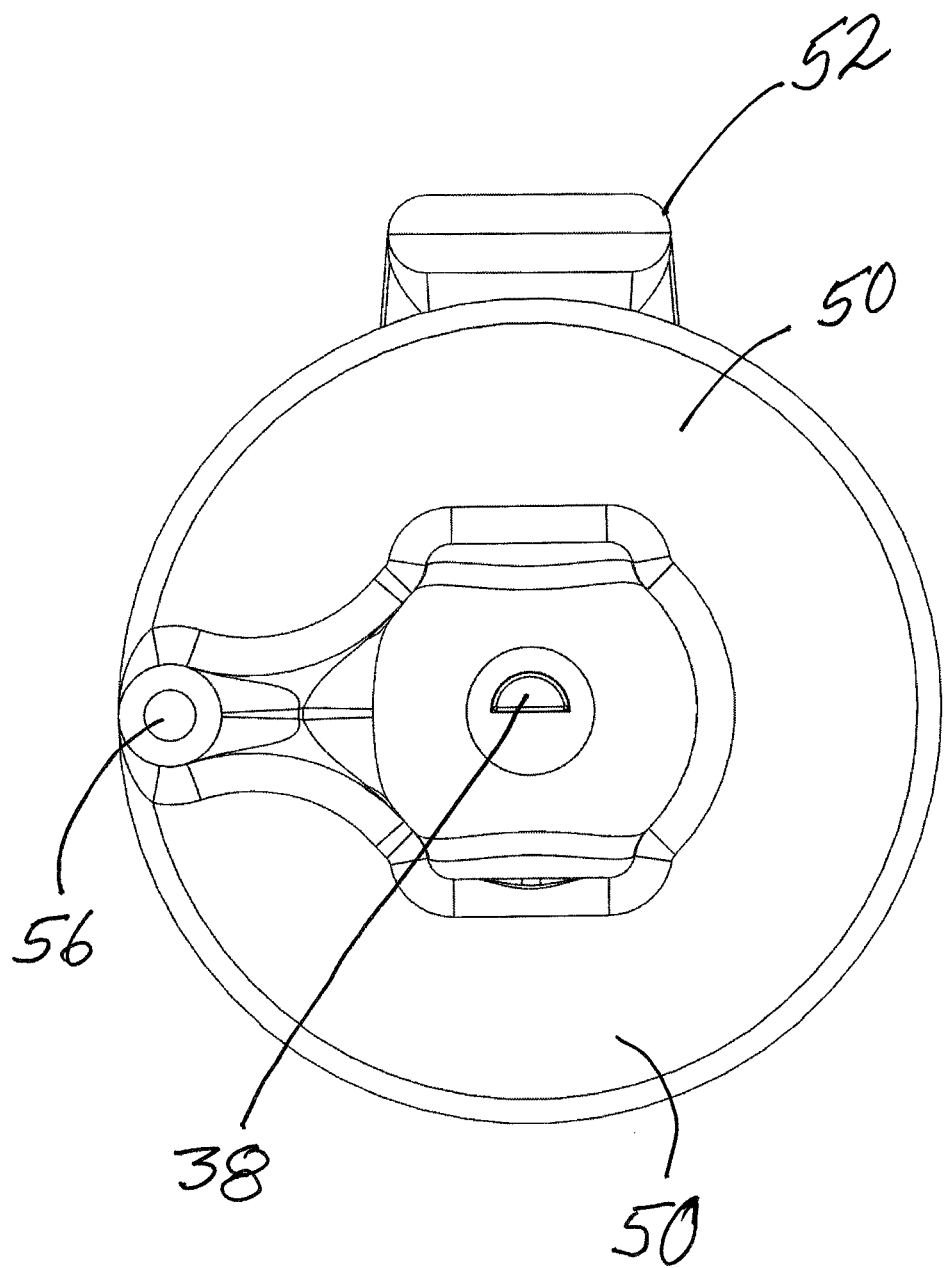
FIG. 7 is bottom view of the spindle and spool assembly of the remotely controlled tip up assembly of the present invention.
Figure 8:
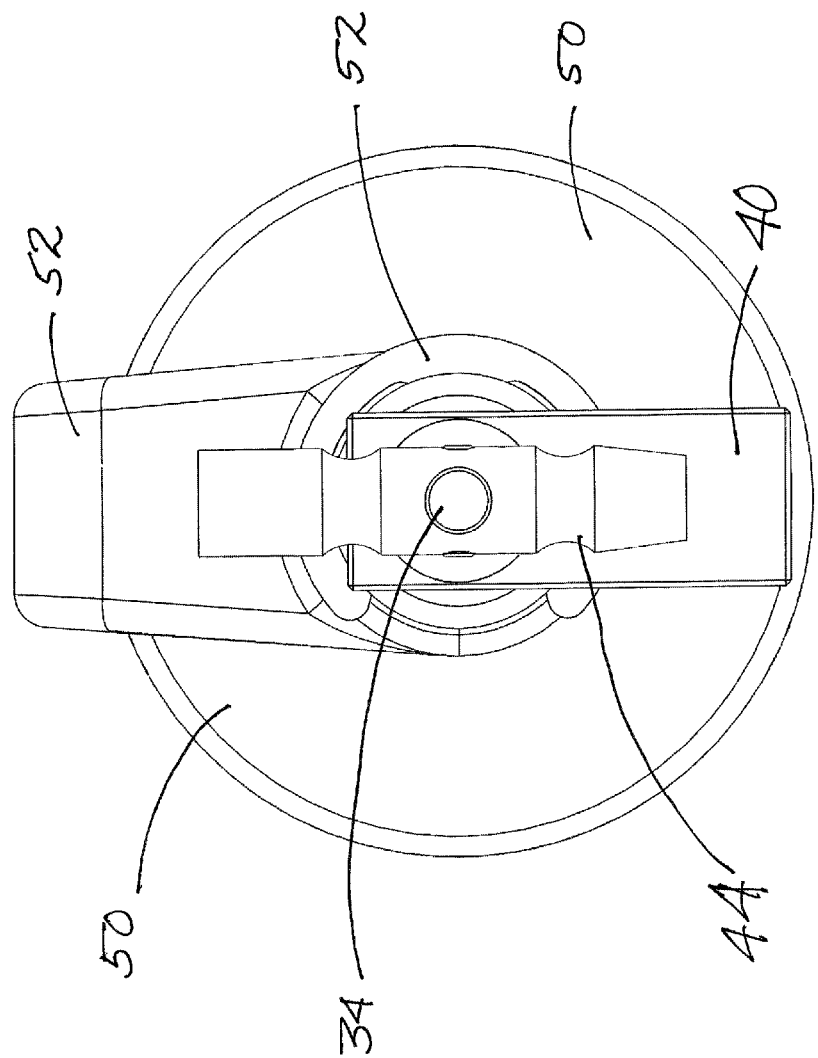
FIG. 8 is a top view of the spindle and spool assembly of the remotely controlled tip up assembly of the present invention.

Referring now to FIG. 6, an exploded view of the spindle and spool assembly 30 is provided. Both the spool member 50 and the line guide member 52 are readily removed from the rotatable inner shaft 34 of the spindle and spool assembly 30 for repair or replacement. The spool member 50 is rigidly secured to the second end 38 of the rotatable inner shaft 34. The second end 38 of the inner shaft 34 contains a flat area 39. The spool member 50 contains a central, axial aperture through which the second end 38 of the inner shaft 34 passes. The spool member 50 includes a threaded aperture 57 at the end opposite the mounting block member 40. A set screw member 58 threaded into the threaded aperture 57 contacts the flat area 39 of the inner shaft 34 to retain the spool member 50 there on. In addition, the spool member 50 includes a handle 56 opposite the mounting block member 40, which the fisherman grasps to rapidly wind fishing line onto the spool member 50. Also, the central portion of the spool member 50 contains grooves which provide facile removal of the fishing line as a fish swims away with the bait. An enlarged bottom view of the spool member 50 and line guide member 52 secured to the inner shaft 34 of the spindle and spool assembly 30 is shown in FIG. 7, while FIG. 8 provides a top view of these components.

The line guide member 52 is rotatably retained on the stationary outer tube 33 above the spool member 50 by an E-clip member 59, which allows the line guide member 52 to rotate freely on the outer tuber 33. In addition, the aperture 54 of the line guide member 52 has sufficient length to span the full width of the spool member 50. Thus, fishing line can be wound evenly across the full width of the spool member 50. The spool member 50 at the end of the spindle and spool assembly 30 can be easily exchanged with spool members 50 of various line capacity for fishing in shallow or deep waters. The aperture 54 of the line guide member 52 extends the full height of the spool member 50 for even winding and unwinding of the line thereon.

The ability of the spool member 50 and line guide member 52 to be easily removed from the spindle and spool assembly 30 provides unique advantages to the tip up assembly 10 invention. In order to maintain free rotation of the rotatable inner shaft 34 within the stationary outer shaft 33 when the rotatable shaft assembly 32 is partially immersed in water, current practice in the industry is to fill the space between the inner shaft 34 and the outer shaft 33 with a heavy oil or similar water immiscible fluid. A seal at each end of the outer shaft 33 contains the fluid in place. However, these seals are prone to leakage of the fluid and subsequent failure.

Figure 12:
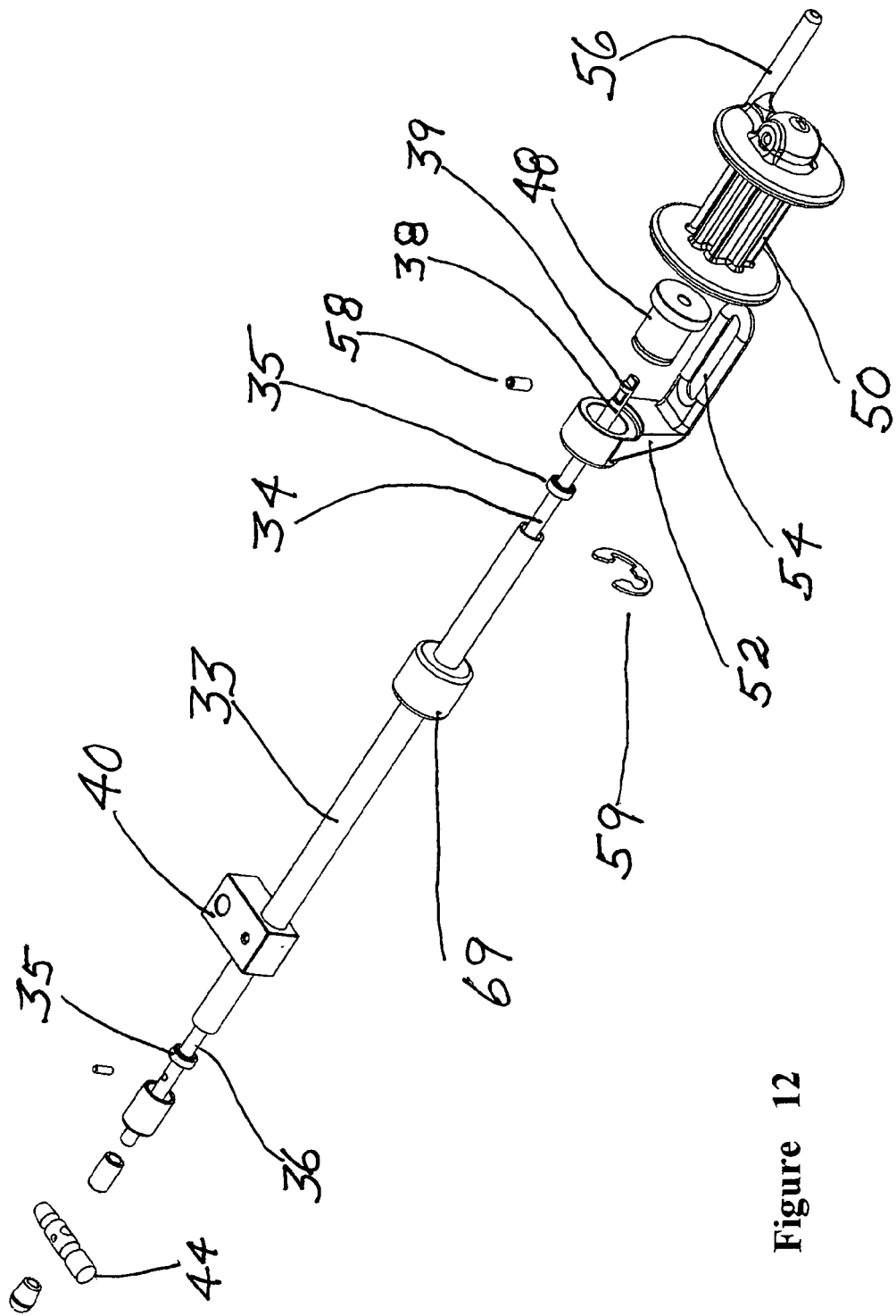
FIG. 12 is another exploded view of the spindle and spool assembly of the remotely controlled tip up assembly of the present invention.

The present invention employs a pair of sealed bearings 35, one bearing 35 secured at each end of the stationary outer shaft 33 forming a tight yet movable seal with the inner shaft 34. Referring to FIG. 12, a first sealed bearing 35 is positioned adjacent to mounting block 40 and a second sealed bearing 35 is located at the opposite end of the outer shaft 33 adjacent the end cap 48 of the line guide member 52, surrounding the outer shaft 33 and the inner shaft 34. The end cap 48 includes a groove into which an E-clip member 59 is positioned to retain the line guide member 52 on the inner shaft 34. Removing the E-clip member 59 allows the end cap 48 and line guide member 52 to slide off of the inner shaft 34 and to be removed from the spindle and spool assembly 30.

To further exclude water from the space between the inner shaft 34 and the outer shaft 33, an inert filler material, such as a polymer foam, occupies this space, the filler material allowing rotation of the inner shaft 34.

Referring again to FIGS. 1-5, the signaling system of the tip up assembly 10 includes a signal pole member 60 with multiple means to indicated that a fish has taken the bait. The signal pole member 60 is secured to the platform member 14 by means of a spring member 62 that biases the signal pole member 60 in an upright position. There are both a flag member 72 and a signal light member 74 secured to the signal pole member 60, with the signal light member 74 powered by a power source within the electronic communication module 80. Also within the electronic communication module 80 is an audible signal source, best seen in FIG. 13, a second light source, the trigger lighting member 86, that illuminates the trigger member 44 of the spindle and spool assembly 30 when actuated, and a radio signal generator source 88 within the electronic communication module 80. An ON/OFF power switch 82 is also present on the module 80.

In operation, the signal pole member 60 is held parallel to the planar platform member 14 by engaging the signal pole release member 64 secured to the signal pole member 40 with the trigger member 44 of the spool and spindle assembly 30. This configuration of the signal pole member 40 is similar to that shown in FIG. 9. The position of the signal pole member 60 is sensed by the electronics communication module 80. The module 80 contains an internal magnetic switch 79 (shown in phantom) and the signal pole member 60 includes an attached magnet member 78. The internal magnetic switch 79 and magnet member 78 are in close proximity with the signal pole member 60 engaging the trigger member 44 of the spool and spindle assembly 30. A fish pulling line off the spool member 50 causes rotation of the spool member 50 as well as the attached rotatable inner shaft 34 of the spindle and spool assembly 30. This rotation causes the attached trigger member 44 to pivot and disengage the signal pole member 60, which is elevated to an upright position by the biasing spring 62. Elevation of the signal pole member 60 moves the attached magnet member 78 away from the magnet switch 79, which activates the signal system 70. This movement of the signal pole member 60 activates the signal light member 74 on the signal pole member 60, as well as the second light source, the trigger lighting member 86, that illuminates the trigger member 44. Additionally, movement of the signal pole member 60 and activation of the signal light member 74 also turns on an audible alarm 89 that notifies the fisherman if he is not looking at the tip up assembly 10. The electronics communication module 80 is also in communication with a remote receiver and control device 90 carried by the fisherman. Should the fisherman be out of range of the visual and audible signals from the tip up assembly 10, the remote receiver and control device 90 provides notification that the other signal means have been activated.

Figure 9:
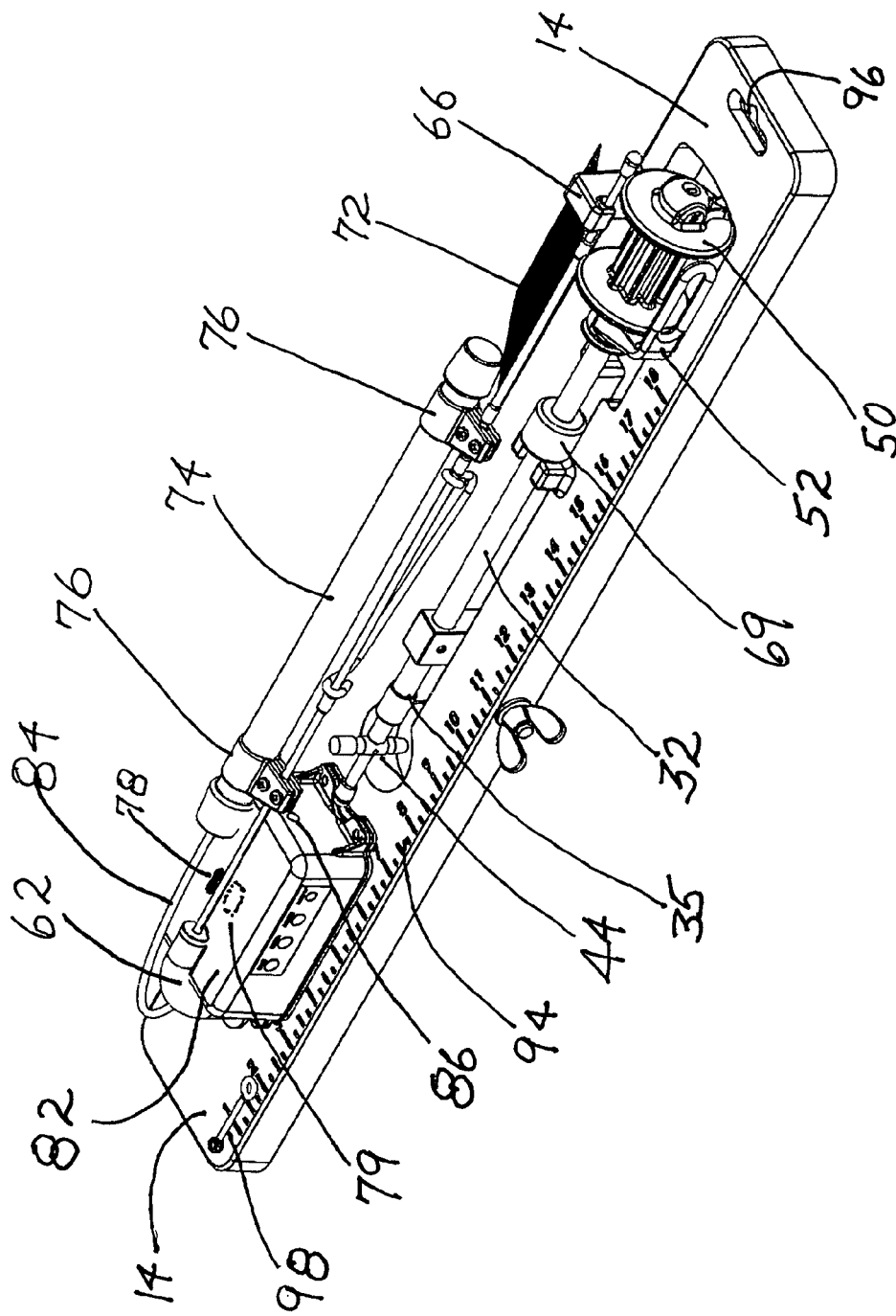
FIG. 9 is a perspective view of the remotely controlled tip up assembly of the present invention in a storage configuration.
Figure 10:
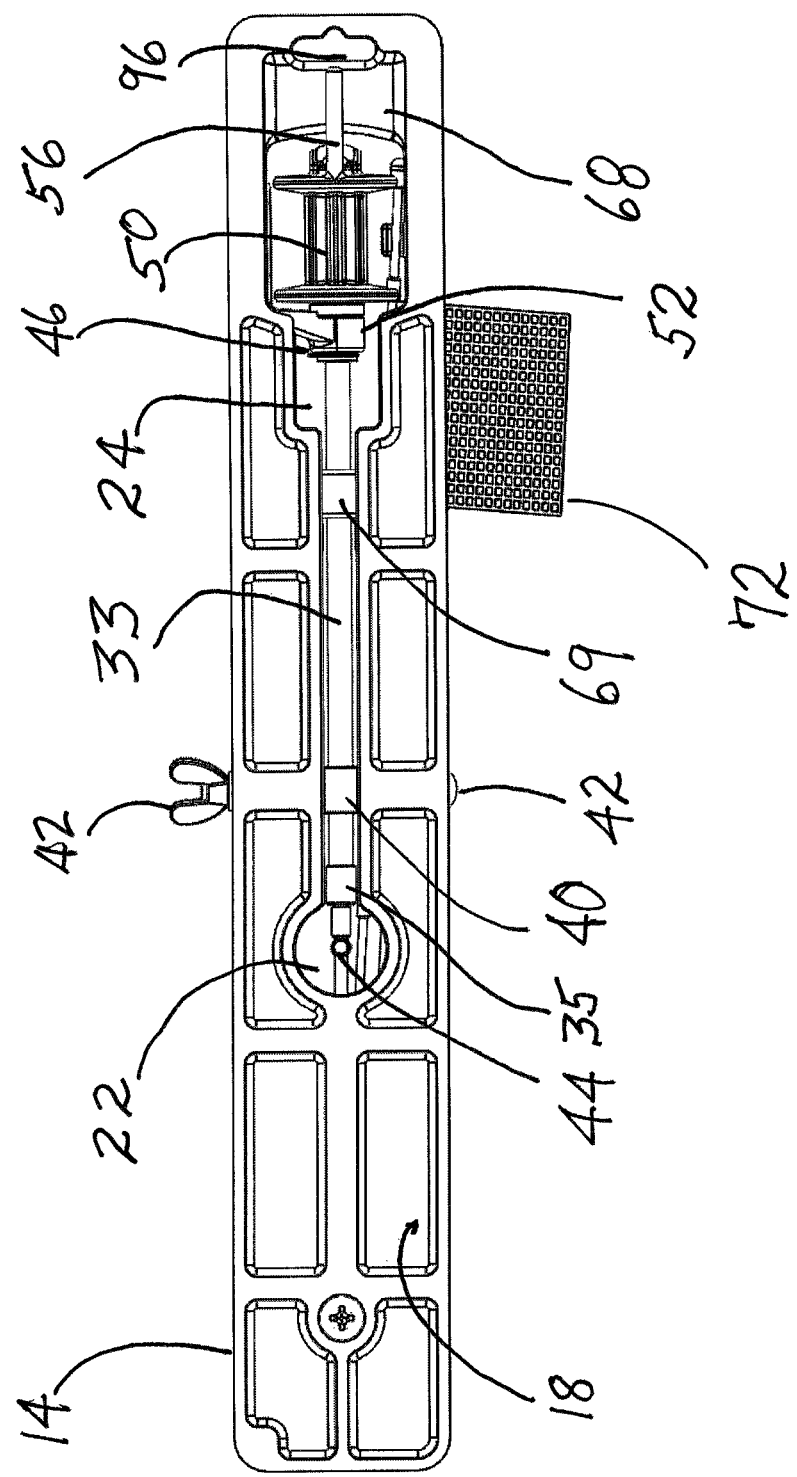
FIG. 10 is a bottom view of the remotely controlled tip up assembly of the present invention in the storage configuration.

Referring now to FIGS. 9 and 10, several views of the tip up assembly 10 in the storage configuration are shown. For storage, the spindle and spool assembly 30 is rotated to be parallel with the planar platform member 14 and positioned within the linear slot 20 thereof. As mentioned above, the linear slot 20 includes enlarged sections 22, 24 to accommodate the trigger member 44 and the spool member 50 and line guide member 52. The spindle and spool assembly 30 is locked in place by tightening the nut and bolt assembly 42. In addition, the barrel lock member 69, which is free to move up and down the stationary outer tube 33 of the rotatable shaft assembly 32, slides away from the spool member 50 and line guide member 52. The barrel lock member 69 is sized to pass through the enlarged section 24 of the liner slot 20 of the platform member 14, but not the narrow section thereof adjacent the mounting block member 40. Thus, the barrel lock member 69, in combination with the handle 56 of the spool member 50, holds the spindle and spool assembly 30 in the storage configuration shown in FIG. 9.

As shown in FIG. 10, the second surface 18 of the planar platform member 14 includes a storage pocket 68 adjacent to the end of the platform member 14 opposite the attachment point of the signal pole member 60 to accommodate the handle 56 of the spool member 50. In addition, the signal pole member 60 containing the signal light member 74 and flag member 72 is positioned parallel with the first surface 16 of the planar platform member 14, and held in place by a signal pole retainer 66. A hanging storage aperture 96 in the planar platform member 14 allows the tip up assembly 10 to be secured on a peg or nail for safe storage. Further, an elastic anchor member 98 is secured to the first surface 16 of the planar platform member 14 to engage any hook that may be on the fishing line on the spool, particularly with the tip up assembly 10 in the storage configuration. Also, the planar platform member 14 includes a linear measure 94 on the first surface 16 thereof which enables the fisherman to measure the length of a fish.

Figure 11:
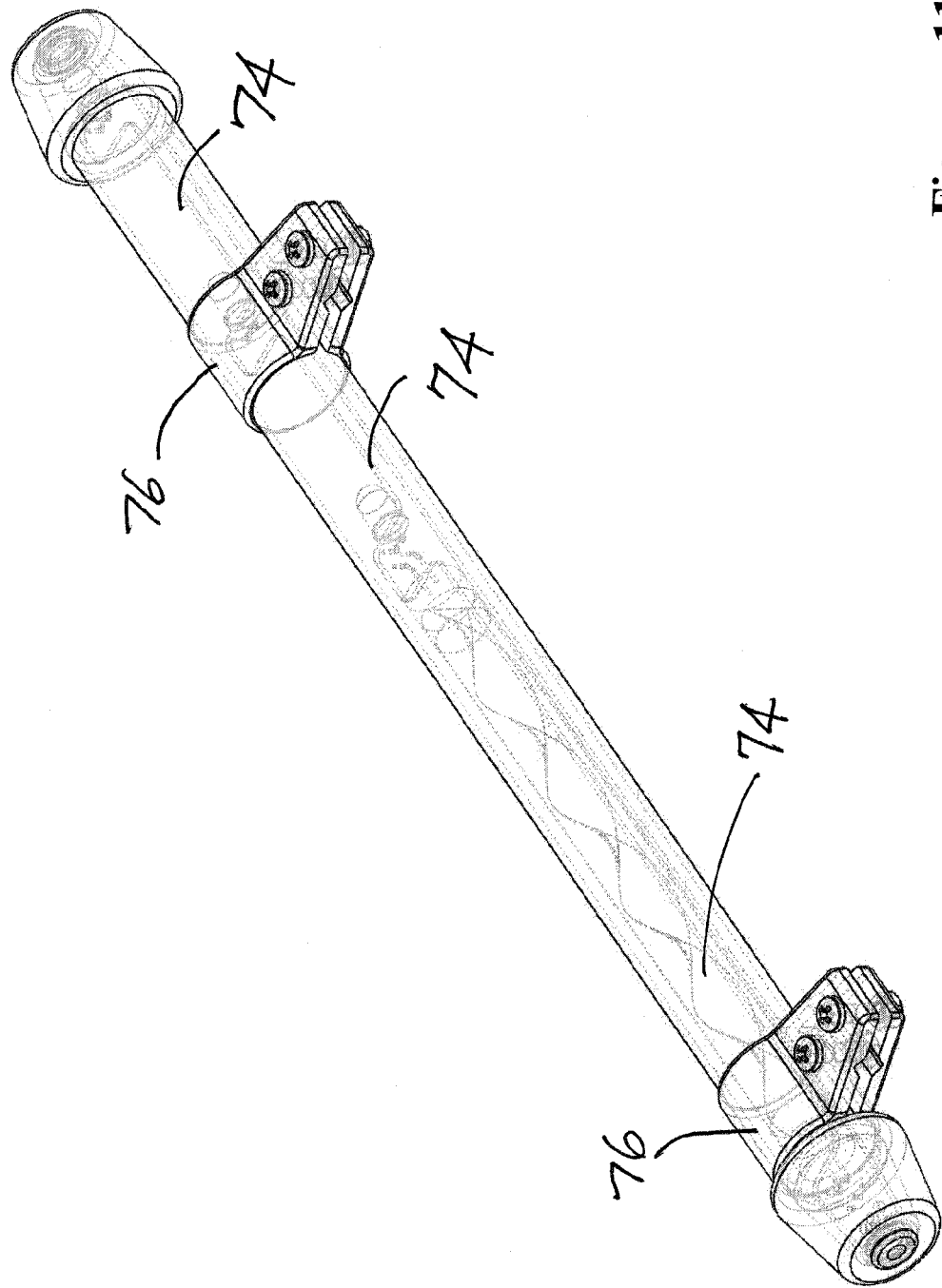
FIG. 11 is a perspective view of the light tube of the remotely controlled tip up assembly of the present invention.
Figure 13:
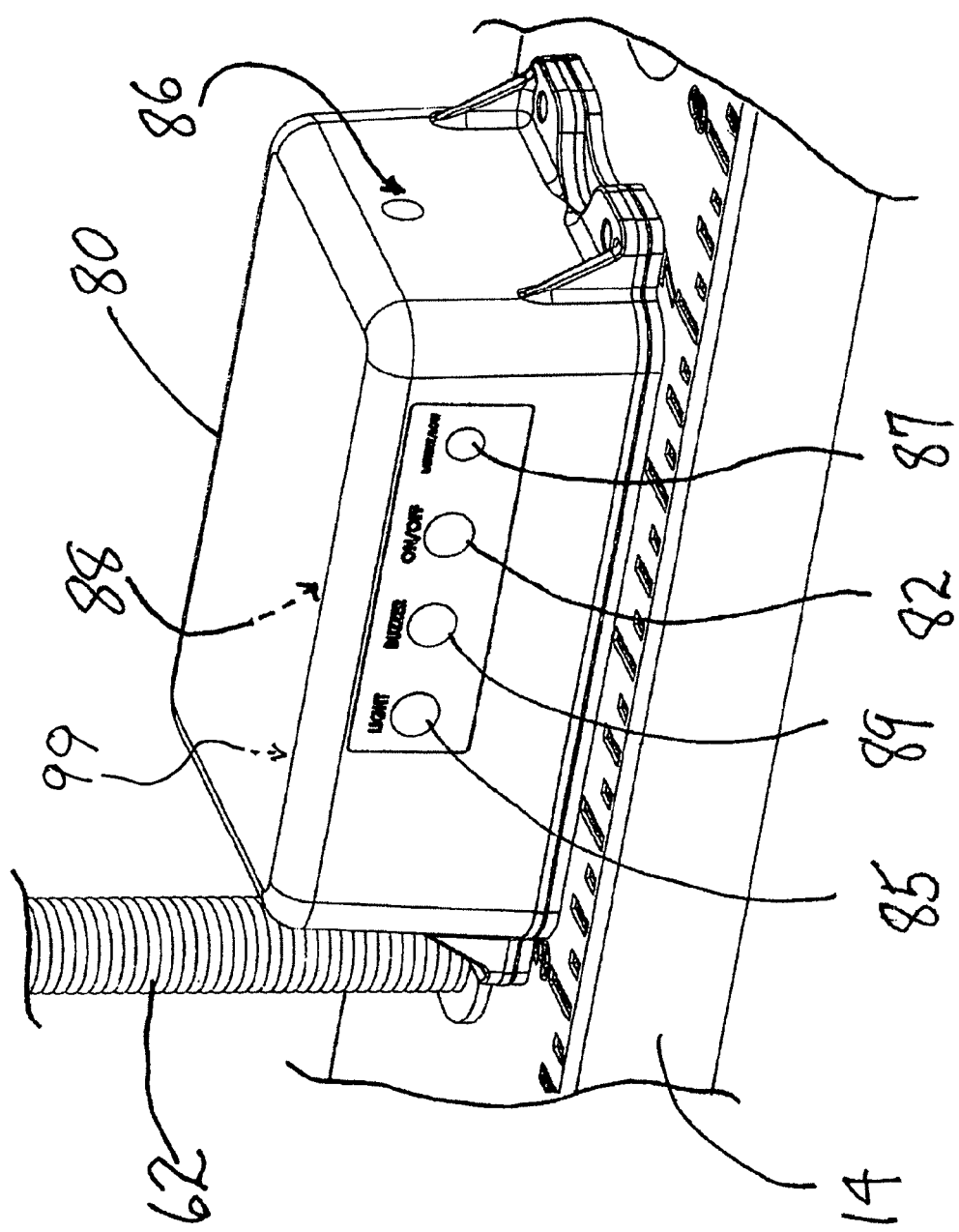
FIG. 13 is an enlarged perspective view of the electronics communications module of the remotely controlled tip up assembly of the present invention.

FIG. 11 shows a perspective view of the signal light member 74, a light tube, that is attached to the signal pole member 60 by a plurality of attachment clips 76. The signal light member 74 (the light tube) provides an extremely bright light that is readily visible from a long distance. An enlarged view of the electronics communication module 80 is shown in FIG. 13. The module 80 is secured to the first surface 16 of the planar platform member 14 adjacent to the signal pole member 60. The electronics communications module 80 includes an internal power source 88, preferably a rechargeable battery, connected to and selectively powering the signal light member 74. The electronics communication module 80 also contains an audible signal source 89 that is activated upon the signal pole member 60 springing to an upright position. A second light source 86 illuminate the trigger member 44 on the spindle and spool assembly 30 upon movement of the signal pole member 60. In addition, a radio signal source 88 located within the electronics communication module 80 is activated upon the signal pole member 60 springing to an upright position. The electronics communication module 80 further includes a low power source indicator 87, as well as an ON/OFF switch 82 controlling the power source of the communication module 80 In a preferred embodiment of the invention, the electronics communication module 80 includes an internal magnet switch 79 and the signal pole member 60 contains a magnet 78, which is located in close proximity to the magnet switch 79 with the signal pole member 60 engaged with the trigger member 44 of the spindle and spool assembly 30. The magnet switch 79 within the electronics communication module 80 senses the movement of the magnet 78 on the signal pole member 60 upon elevation of the pole member 60 and thereby activates the various signaling means to alert the fisherman that the trigger member 44 is disengaged from the signal pole member 60. Such a magnet-magnetic switch combination is merely one of the options contemplated for sensing movement of the signal pole member 60 upon disengagement of the trigger member 44.

Figure 14:
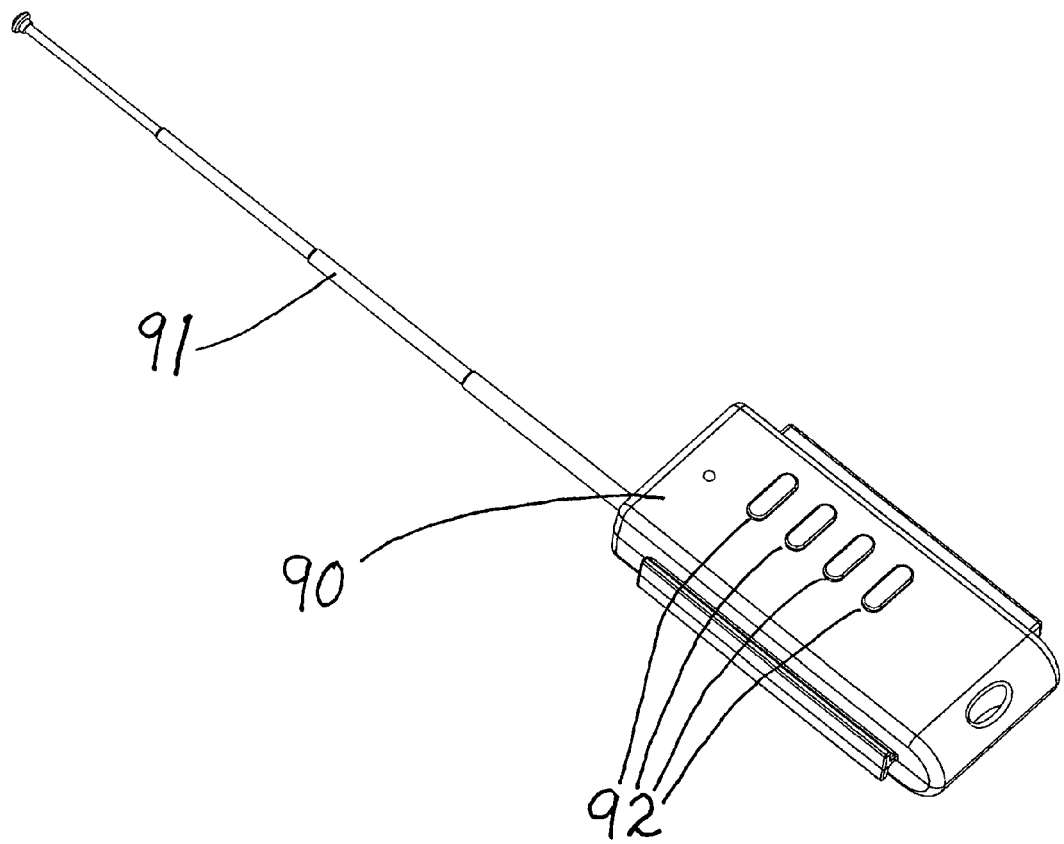
FIG. 14 is a perspective view of the remote control device of the remotely controlled tip up assembly of the present invention.

In a further embodiment of the invention, a remote control device 90, shown in FIG. 14, is in communication with the electronics communication module 80 of the tip up assembly 10. The remote control device 90 includes an antenna 91 for receiving signals from and sending signals to the electronics communication module 80. The remote control device 90 also includes a plurality of signaling means 92, such as push buttons, for sending various signals to the electronics communication module 80. The remote control device 90 may be as complex and a "smart phone," which is programed with software suitable for receiving information from and sending commands to the electronics communication module 80 of the tip up assembly 10 of the present invention. While the invention has been particularly shown and described with reference to preferred embodiments thereof, it will be understood by those skilled in the art that various changes in form and details may be made therein without departing from the spirit and scope of the invention.

I claim:

1. A tip up fishing assembly for catching fish through a hole in a surface of ice, comprising:
    a planar platform member having a long axis and a short axis, said platform member adapted to span the hole in the surface of ice;
    said planar platform member having a first surface positionable opposite the surface of ice and a second surface positionable adjacent the surface of ice;
    said planar platform member having a linear slot there through, with said linear slot extending along said long axis thereof;
    a spindle and spool assembly includes a rotatable shaft unit having a first end and a second end, said rotatable shaft unit including a stationary outer tube and a rotatable inner shaft with a mounting block member secured to the outer tube a selected distance from said first end of the rotatable shaft unit, said rotatable shaft unit and mounting block member sized to fit within said linear slot of said planar platform member;
    said rotatable inner shaft having a trigger member attached at a first end thereof and a spool member of selected height and a line guide member attached at a second end thereof, the rotatable shaft unit, trigger member, spool member and line guide member sized to pass through said linear slot of the planar platform member;
    said mounting block member rotatably secured within said linear slot of said planar platform member, said mounting block member selectively rotatable and lockable to maintain said rotatable shaft unit parallel with said planar platform member or perpendicular to said planar platform member, thereby adapting said second end of said shaft unit to extend into the hole in the ice;
    a signal pole member mounted on said first surface of said planar platform member adjacent one end thereof, the signal pole member spring-biased to an upright position, said signal pole member being manually positionable to a bent-over position, said signal pole member having a trigger release member reversibly engaging said trigger member of said rotatable shaft unit and operative to hold said signal pole member in said bent-over position until such time as said spool member rotates, thereby rotating said inner shaft and attached trigger member to release said trigger release member and attached signal pole member, thereby enabling the signal pole member to spring to said upright position;
    a first signal system actuated upon movement of said signal pole member from parallel with said planar platform member in the bent-over position to perpendicular thereto in the upright position, said first signal system including a visual signal of a visual flag, a first and a second light source, an audible signal source and a radio signal source;
    an electronics communications module secured to said first surface of said planar platform member adjacent to said signal pole member, said electronics communications module including a power source connected to and selectively powering said first light source, said audible signal source, said second light source illuminating said trigger member on said inner shaft, said radio signal source, and including an ON/OFF switch controlling said power source; and
    a remote control device adapted for radio communication with said electronics communications module, said remote control device including a second signal system to notify a fisherman of the actuation of said first signal system.

2. The tip up fishing assembly for catching fish through a hole in a surface of ice of claim 1, further including a rigid handle member extending from an end of the spool member opposite the mounting block member of the spindle and spool assembly.

3. The tip up fishing assembly for catching fish through a hole in a surface of ice of claim 2, further including a storage pocket in the second surface of the planar platform member adjacent an end of the linear slot therein opposite the signal pole member, the storage pocket accommodating the spool handle with the tip up fishing assembly in a storage configuration.

4. The tip up fishing assembly for catching fish through a hole in a surface of ice of claim 1, wherein the spool member contains an axial aperture there through with a threaded aperture intersecting the axial aperture, and the second end of the rotatable inner shaft of the spindle and spool assembly opposite the trigger member contains a flat section, and a fastener rotated into said threaded aperture contacts said flat section of the rotatable inner shaft, thereby removably retaining said spool member on said shaft.

5. The tip up fishing assembly for catching fish through a hole in a surface of ice of claim 1, wherein the line guide member contains an aperture extending the full selected height of the spool member, the line guide member removably secured by an E-clip member to the stationary outer tube of the spindle and spool assembly.

6. The tip up fishing assembly for catching fish through a hole in a surface of ice of claim 1, further including a signal pole retainer mounted on the first surface of the planar platform member adjacent the linear slot therein, the signal pole retainer sized to prevent passage of the spool member above the first surface of the platform member.

7. The tip up fishing assembly for catching fish through a hole in a surface of ice of claim 1, wherein the planar platform member includes a measurement ruler and an elastic hook holder on the first surface thereof.

8. The tip up fishing assembly for catching fish through a hole in a surface of ice of claim 1, wherein
    the spindle and spool assembly includes a pair of sealed bearing members, one bearing member of the pair of sealed bearing members secured at each end of the stationary outer tube with the pair of sealed bearing members forming a movable seal with the rotatable inner shaft of the spindle and spool assembly; and
    further including a movable barrel lock member on the stationary outer tube of the spindle and spool assembly, the barrel lock member positionable to prevent passage of the spool member below the second surface of the platform member.

9. A tip up fishing assembly for catching fish through a hole in a surface of ice, comprising:
  a planar platform member having a long axis and a short axis, said platform member adapted to span the hole in the surface of ice;
  said planar platform member having a first surface positionable opposite the surface of ice and a second surface positionable adjacent the surface of ice;
  said planar platform member having a linear slot there through, with said linear slot extending along said long axis thereof;
  a spindle and spool assembly includes a rotatable shaft unit having a first end and a second end, said rotatable shaft unit including a stationary outer tube and a rotatable inner shaft with a mounting block member secured to the outer tube a selected distance from said first end of the rotatable shaft unit, said rotatable shaft unit and mounting block member sized to fit within said linear slot of said planar platform member;
  said rotatable inner shaft having a trigger member attached at a first end thereof and a spool member of a selected height and a line guide member attached at a second end thereof, a rigid handle member extending from an end of the spool member opposite the mounting block member of the spindle and spool assembly, the rotatable shaft unit, trigger member, spool member and line guide member sized to be positioned in said linear slot of the planar platform member;
  said mounting block member rotatably secured within said linear slot of said planar platform member, said mounting block member selectively rotatable and lockable to maintain said rotatable shaft unit parallel with said planar platform member or perpendicular to said planar platform member, thereby adapting said second end of said shaft unit to extend into the hole in the ice;
  a signal pole member mounted on said first surface of said planar platform member adjacent one end thereof, the signal pole member spring-biased to an upright position, said signal pole member being manually positionable to a bent-over position, said signal pole member having a trigger release member reversibly engaging said trigger member of said rotatable shaft unit and operative to hold said signal pole member in said bent-over position until such time as said spool member rotates, thereby rotating said inner shaft and attached trigger member to release said trigger release member and attached signal pole member, thereby enabling the signal pole member to spring to said upright position;
  a storage pocket in the second surface of the planar platform member adjacent an end of the linear slot therein opposite the signal pole member, the storage pocket accommodating the spool handle with the tip up fishing assembly in a storage configuration;
  a first signal system actuated upon movement of said signal pole member from parallel with said planar platform member in the bent-over position to perpendicular there to in the upright position, said first signal system including a visual signal of a signal flag, a first and a second light source, an audible signal source and a radio signal source;
  an electronics communications module secured to said first surface of said planar platform member adjacent to said signal pole member, said electronics communications module including a power source connected to and selectively powering said first light source, said audible signal source, said second light source illuminating said trigger member on said inner shaft, said radio signal source, and including an ON/OFF switch controlling said power source; and
  a remote control device adapted for radio communication with said electronics communications module, said remote control device including a second signal system to notify a fisherman of the actuation of said first signal system.

10. The tip up fishing assembly for catching fish through a hole in a surface of ice of claim 9, wherein the spool member contains an axial aperture there through with a threaded aperture intersecting the axial aperture, and the second end of the rotatable inner shaft of the spindle and spool assembly opposite the trigger member contains a flat section, and a fastener rotated into said threaded aperture contacts said flat section of the rotatable inner shaft, thereby removably retaining said spool member on said shaft.

11. The tip up fishing assembly for catching fish through a hole in a surface of ice of claim 9, wherein the line guide member contains an aperture extending the selected height of the spool member, the line guide member removably secured by an E-clip member to the stationary outer tube of the spindle and spool assembly.

12. The tip up fishing assembly for catching fish through a hole in a surface of ice of claim 9, further including a signal pole retainer mounted on the first surface of the planar platform member adjacent the linear slot therein, the signal pole retainer sized to prevent passage of the spool member above the first surface of the platform member.

13. The tip up fishing assembly for catching fish through a hole in a surface of ice of claim 9, wherein the planar platform member includes a measurement ruler and an elastic hook holder on the first surface thereof.

14. The tip up fishing assembly for catching fish through a hole in a surface of ice of claim 9, wherein the spindle and spool assembly includes a pair of sealed bearing members, one bearing member of the pair of sealed bearing members secured at each end of the stationary outer tube with the pair of sealed bearing members forming a movable seal with the rotatable inner shaft of the spindle and spool assembly; and
  further including a movable barrel lock member on the stationary outer tube of the spindle and spool assembly, the barrel lock member positionable to prevent passage of the spool member below the second surface of the platform member.

15. A tip up fishing assembly for catching fish through a hole in a surface of ice, comprising:
  a planar platform member having a long axis and a short axis, said platform member adapted to span the hole in the surface of ice;
  said planar platform member having a first surface positionable opposite the surface of ice and a second surface positionable adjacent the surface of ice;
  said planar platform member having a linear slot there through, with said linear slot extending along said long axis thereof;
  a spindle and spool assembly includes a rotatable shaft unit having a first end and a second end, said rotatable shaft unit including a stationary outer tube and a rotatable inner shaft with a mounting block member secured to the outer tube a selected distance from said first end of the rotatable shaft unit, said rotatable shaft unit and mounting block member sized to fit within said linear slot of said planar platform member;
  said rotatable inner shaft having a trigger member attached at a first end thereof and a spool member of a selected height and a line guide member attached at a second end thereof, a rigid handle member extending from an end of the spool member opposite the mounting block member of the spindle and spool assembly, the rotatable shaft unit, trigger member, spool member and line guide member sized to be positioned in said linear slot of the planar platform member;

said spool member containing an axial aperture there through with a threaded aperture intersecting the axial aperture, and the second end of the rotatable inner shaft of the spindle and spool assembly opposite the trigger member containing a flat section, whereby a fastener rotated into said threaded aperture contacts said flat section of the rotatable inner shaft, thereby removably retaining said spool member on said shaft;

said mounting block member rotatably secured within said linear slot of said planar platform member, said mounting block member selectively rotatable and lockable to maintain said rotatable shaft unit parallel with said planar platform member or perpendicular to said planar platform member, thereby adapting said second end of said shaft unit to extend into the hole in the ice;

a signal pole member mounted on said first surface of said planar platform member adjacent one end thereof, the signal pole member spring-biased to an upright position, said signal pole member being manually positionable to a bent-over position, said signal pole member having a trigger release member reversibly engaging said trigger member of said rotatable shaft unit and operative to hold said signal pole member in said bent-over position until such time as said spool member rotates, thereby rotating said inner shaft and attached trigger member to release said trigger release member and attached signal pole member, thereby enabling the signal pole member to spring to said upright position;

a storage pocket in the second surface of the planar platform member adjacent an end of the linear slot therein opposite the signal pole member, the storage pocket accommodating the spool handle with the tip up fishing assembly in a storage configuration;

a first signal system actuated upon movement of said signal pole member from parallel with said planar platform member in the bent-over position to perpendicular there to in the upright position, said first signal system including a visual signal of a signal flag, a first and a second light source, an audible signal source and a radio signal source;

an electronics communications module secured to said first surface of said planar platform member adjacent to said signal pole member, said electronics communications module including a power source connected to and selectively powering said first light source, said audible signal source, said second light source illuminating said trigger member on said inner shaft, said radio signal source, and including an ON/OFF switch controlling said power source; and a remote control device adapted for radio communication with said electronics communications module, said remote control device including a second signal system to notify a fisherman of the actuation of said first signal system.

16. The tip up fishing assembly for catching fish through a hole in a surface of ice of claim 15, wherein the line guide member contains an aperture extending the selected height of the spool member, the line guide member removably secured by an E-clip member to the stationary outer tube of the spindle and spool assembly.

17. The tip up fishing assembly for catching fish through a hole in a surface of ice of claim 15, further including a signal pole retainer mounted on the first surface of the planar platform member adjacent the linear slot therein, the signal pole retainer sized to prevent passage of the spool member above the first surface side of the platform member.

18. The tip up fishing assembly for catching fish through a hole in a surface of ice of claim 15, wherein the planar platform member includes a measurement ruler and an elastic hook holder on the first surface thereof.

19. The tip up fishing assembly for catching fish through a hole in a surface of ice of claim 15, wherein the spindle and spool assembly includes a pair of sealed bearing members, one bearing member of the pair of sealed bearing members secured at each end of the stationary outer tube with the pair of sealed bearing members forming a movable seal with the rotatable inner shaft of the spindle and spool assembly; and further including a movable barrel lock member on the stationary outer tube of the spindle and spool assembly, the barrel lock member positionable to prevent passage of the spool member below the second surface of the platform member.

* * * * *